(12) United States Patent
Staal et al.

(10) Patent No.: US 12,134,240 B2
(45) Date of Patent: Nov. 5, 2024

(54) METHODS FOR REPAIRING COMPOSITE MATERIAL USING PRE-CURED PLUGS

(71) Applicant: The Boeing Company, Chicago, IL (US)

(72) Inventors: Remmelt Andrew Staal, Irvine, CA (US); Justin H. Register, Charleston, SC (US); Arne K. Lewis, Auburn, WA (US); Ryan C. Schwartz, Tustin, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/687,618

(22) Filed: Mar. 5, 2022

(65) Prior Publication Data
US 2022/0324186 A1 Oct. 13, 2022

Related U.S. Application Data

(60) Provisional application No. 63/174,490, filed on Apr. 13, 2021.

(51) Int. Cl.
*B29C 73/06* (2006.01)
*B29C 73/10* (2006.01)
(Continued)

(52) U.S. Cl.
CPC .............. *B29C 73/06* (2013.01); *B29C 73/10* (2013.01); *B29C 73/26* (2013.01);
(Continued)

(58) Field of Classification Search
CPC ......... B29C 73/06; B29C 73/10; B29C 73/26; B29C 2073/262; B29C 2073/264; B29C 2073/268; B29L 2031/3076
See application file for complete search history.

(56) References Cited

U.S. PATENT DOCUMENTS 5,190,611 A * 3/1993 Cologna .............. B29C 73/063
29/402.11
6,174,392 B1 1/2001 Reis
(Continued)

FOREIGN PATENT DOCUMENTS

EP 3750698 A1 * 12/2020 ........... B29C 70/747
FR 3092787 A1 * 8/2020 ............. B29C 70/24

OTHER PUBLICATIONS

Extended European Search Report dated Sep. 14, 2022 in European Patent Application No. 22164482.6 (European counterpart to the instant U.S. patent application).
(Continued)

*Primary Examiner* — Alison L Hindenlang
*Assistant Examiner* — Erica Hartsell Funk
(74) *Attorney, Agent, or Firm* — Ostrager Chong Flaherty & Broitman P.C.

(57) ABSTRACT

A method for repairing a composite structure using pre-cured plugs. In accordance with one method, composite material is removed from a first composite laminate to form a cavity bounded by a tapered internal surface that extends from an opening at an outer mold line surface of the first composite laminate. In addition, a second composite laminate is machined to form a plug having a tapered surface. Then the plug is placed so that the tapered surface of the plug opposes the tapered internal surface of the first composite laminate. Thereafter, the tapered surface of the plug is bonded to the tapered internal surface of the first composite laminate. Optionally, a hole is drilled in the plug for receiving a fastener.

20 Claims, 9 Drawing Sheets

(51) Int. Cl.
*B29C 73/26* (2006.01)
*B29L 31/30* (2006.01)

(52) U.S. Cl.
CPC .. *B29C 2073/262* (2013.01); *B29C 2073/264* (2013.01); *B29C 2073/268* (2013.01); *B29L 2031/3076* (2013.01)

(56) References Cited

U.S. PATENT DOCUMENTS

| | | | |
|---|---|---|---|
| 8,209,838 | B2 | 7/2012 | Lindgren |
| 9,186,756 | B2* | 11/2015 | Shigetomi ............... B29C 73/10 |
| 9,539,798 | B2 | 1/2017 | Georgeson et al. |
| 10,213,964 | B2* | 2/2019 | Safai ..................... B29C 66/721 |
| 10,518,491 | B2 | 12/2019 | Whitworth et al. |
| 10,589,505 | B2 | 3/2020 | Evens et al. |
| 10,710,352 | B2 | 7/2020 | Bertrand et al. |
| 2014/0295123 | A1* | 10/2014 | Mizuno ..................... B64C 1/12 |
| | | | 428/63 |
| 2016/0159057 | A1 | 6/2016 | Butler |
| 2017/0029088 | A1* | 2/2017 | Gruner ................... B32B 27/18 |
| 2017/0274485 | A1* | 9/2017 | Queant ..................... F16B 5/04 |

OTHER PUBLICATIONS

Canadian Office Action dated Feb. 2, 2024 in Canadian Patent Application No. 3, 153,316 (Canadian counterpart to the instant U.S. patent application).

\* cited by examiner

METHODS FOR REPAIRING COMPOSITE MATERIAL USING PRE-CURED PLUGS

RELATED PATENT APPLICATION

This application claims the benefit, under Title 35, United States Code, Section 119 (e), of U.S. Provisional Application No. 63/174,490 filed on Apr. 13, 2021.

BACKGROUND

The present disclosure generally relates to techniques for repairing areas of a structure made of composite material (e.g., fiber-reinforced plastic (FRP)), and more particularly relates to production and installation of patches and plugs used to repair areas of composite structures.

As used herein, the term "composite laminate" means a cured stack of adhesively bonded plies, each ply consisting of parallel fibers embedded in an epoxy resin (hereinafter "epoxy") matrix. The plies in a stack typically have fiber orientations with varying angles (e.g., 0, 45, 90, and −45 degrees) relative to a reference axis.

Composite structures sometimes include localized areas that may not conform to product and/or performance specifications for any of a variety of reasons. Localized non-conformities may be reduced or eliminated by reworking the structure. Composite parts and composite structure may also develop discrepancies and require repairs. The rework/repair process may involve removing one or more plies of material from the structure and then replacing the removed material with a composite patch that is adhesively bonded to the structure. As used hereinafter, the term "repair" means repair or rework.

Composite laminates are susceptible to damage due to stress, including wear and tear and impacts. For example, the laminated edges of honeycomb panels are susceptible to edge band damage either at fastener locations due to wear and tear or poor installation or on the edge itself due to impact or foreign object debris. The greatest drawback with existing repair techniques is related to the use of green state or wet layup malleable material. Trying to install small plies of green state material in a step-tapered hole is a complex process that is difficult to complete without introducing bond line flaws or porosity. Green state pre-impregnated material also has a shelf life. The green state repair method is also complicated by the need to accurately install fabric that moves around in a hole prior to and during curing. In addition, accurately sanding tapers into a laminate is a complex process. For example, it is difficult to obtain consistent taper ratios. A combination of the foregoing issues may result in a time-consuming repair.

SUMMARY

The subject matter disclosed herein is directed to methods for restoring the structural and functional capabilities of damaged composite laminate skin in a fast and efficient manner. The basic concept of this repair is to machine out (remove) the damaged portion of the composite material using a tapered router bit, thereby forming a tapered cavity (e.g., a conical hole, a conical recess or a tapered slot) having a predefined shape and taper angle. The next step is to create a tapered plug that matches the cavity using pre-cured shim stock made of similar material (e.g., FRP having fibers made of the same material as the structure under repair). The repair plug can be either machined down from stock conical repair material to the correct thickness and diametric profile or machined specifically for a particular cavity. After machining, the repair plug is bonded in the cavity using glue or adhesive (paste or film). The resulting repair may restore the bearing and pull-through capabilities of the joint as well as the bypass load bearing capability and stiffness.

Optionally, after the pre-cured plug has been bonded to the tapered internal surface that bounds the cavity, a thin pre-cured repair patch (overlying and extending beyond the pre-cured plug) may be bonded to the pre-cured plug and to the surrounding portion of the outer mold line (OML) surface of the original composite structure to provide additional retention force to the final installed repair. This additional overlay patch may or may not be needed depending on the specific requirements of the particular application.

By using a rigid pre-cured material, the method proposed herein eliminates issues such as shelf-life problems with pre-impregnated green state material and the difficulty of dealing with wet layup fabrics. The final repair should also be stronger and produce a greater quality repair due to the use of rigid autoclave-cooked material that is free of porosity and bond line flaws. Additionally, due to the use of pre-cured plugs, the overall footprint of the repair may be reduced due to potentially improved bond line strength and steeper tapers. A pre-cured plug with steeper taper ratios, if designed correctly, may be used to restore a damaged fastener hole with unique pull-through and bearing requirements.

Although various embodiments of methods for repairing composite structures using pre-cured plugs will be described in some detail below, one or more of those embodiments may be characterized by one or more of the following aspects.

One aspect of the subject matter disclosed in detail below is a method for repairing a composite structure comprising: (a) removing composite material from a first composite laminate to form a cavity bounded by a first tapered internal surface that extends from an opening at an outer mold line surface of the first composite laminate; (b) machining a second composite laminate to form a plug having a tapered surface; (c) placing the plug so that the tapered surface of the plug opposes the first tapered internal surface of the first composite laminate; and (d) bonding the tapered surface of the plug to the first tapered internal surface of the first composite laminate.

Another aspect of the subject matter disclosed in detail below is a method for repairing a composite structure comprising: (a) removing composite material from a first composite laminate to form a cavity bounded by a conical internal surface that extends from a first opening at an outer mold line surface to a second opening at an inner mold line surface of the first composite laminate; (b) placing a plug in the cavity such that a conical surface of the plug opposes the conical internal surface of the first composite laminate and respective projecting portions of the plug project beyond the outer and inner mold line surfaces of the first composite laminate, the plug comprising a second composite laminate; (c) machining the respective projecting portions of the plug to reduce the respective distances by which the plug projects beyond the outer and inner mold line surfaces of the first composite laminate; (d) bonding the conical surface of the plug to the conical internal surface of the first composite laminate; and (e) sanding the projecting portions of the plug so that first and second exposed surfaces of the plug are flush with the outer and inner mold line surfaces of the first composite laminate respectively.

A further aspect of the subject matter disclosed in detail below is a method for repairing a composite structure comprising: (a) removing composite material from a first composite laminate to form a cavity partly bounded by a first conical internal surface that extends from a first opening at an outer mold line surface and partly bounded by a second conical internal surface that extends from a second opening at an inner mold line surface of the first composite laminate, wherein the first and second conical internal surfaces intersect at an intersection; (b) placing a first plug in the cavity such that a conical surface of the first plug opposes the first conical internal surface of the first composite laminate and a projecting portion of the first plug projects above the outer mold line surface of the first composite laminate, the first plug comprising a second composite laminate; (c) placing a second plug in the cavity such that a conical surface of the second plug opposes the second conical internal surface of the first composite laminate and a projecting portion of the second plug projects below the inner mold line surface of the first composite laminate, the second plug comprising a third composite laminate; (d) bonding the conical surfaces of the first and second plugs to the first and second conical internal surfaces respectively of the first composite laminate; and (e) sanding the projecting portion of the first plug so that an exposed surface of the first plug is flush with the outer mold line surface of the first composite laminate.

Other aspects of methods for repairing composite structures using pre-cured plugs are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of methods for repairing composite structures using pre-cured plugs are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which can vary from one implementation to another. Moreover, it will be appreciated that such a development effort might be complex and time-consuming, but would nevertheless be a routine undertaking for those of ordinary skill in the art having the benefit of this disclosure.

The embodiments disclosed below relate to methods of repairing or reworking an area of a composite structure in order to eliminate discrepancies in the structure and/or to change physical characteristics of localized areas of the structure. The methodology proposed herein may be used to rework a composite workpiece in process or to repair a composite component which has been removed from service. For ease of the following description, the terms "repair" and "repairing" are intended to include repairs made to and rework done on a discrepant region of a composite structure.

For the purpose of illustration, various embodiments of a method for repairing composite structures will be described in the context of aircraft manufacturing and service. However, it should be appreciated that the technology disclosed herein is equally applicable to repairing composite structure other than fuselages, wings, and stabilizers of an aircraft.

Figure 5:
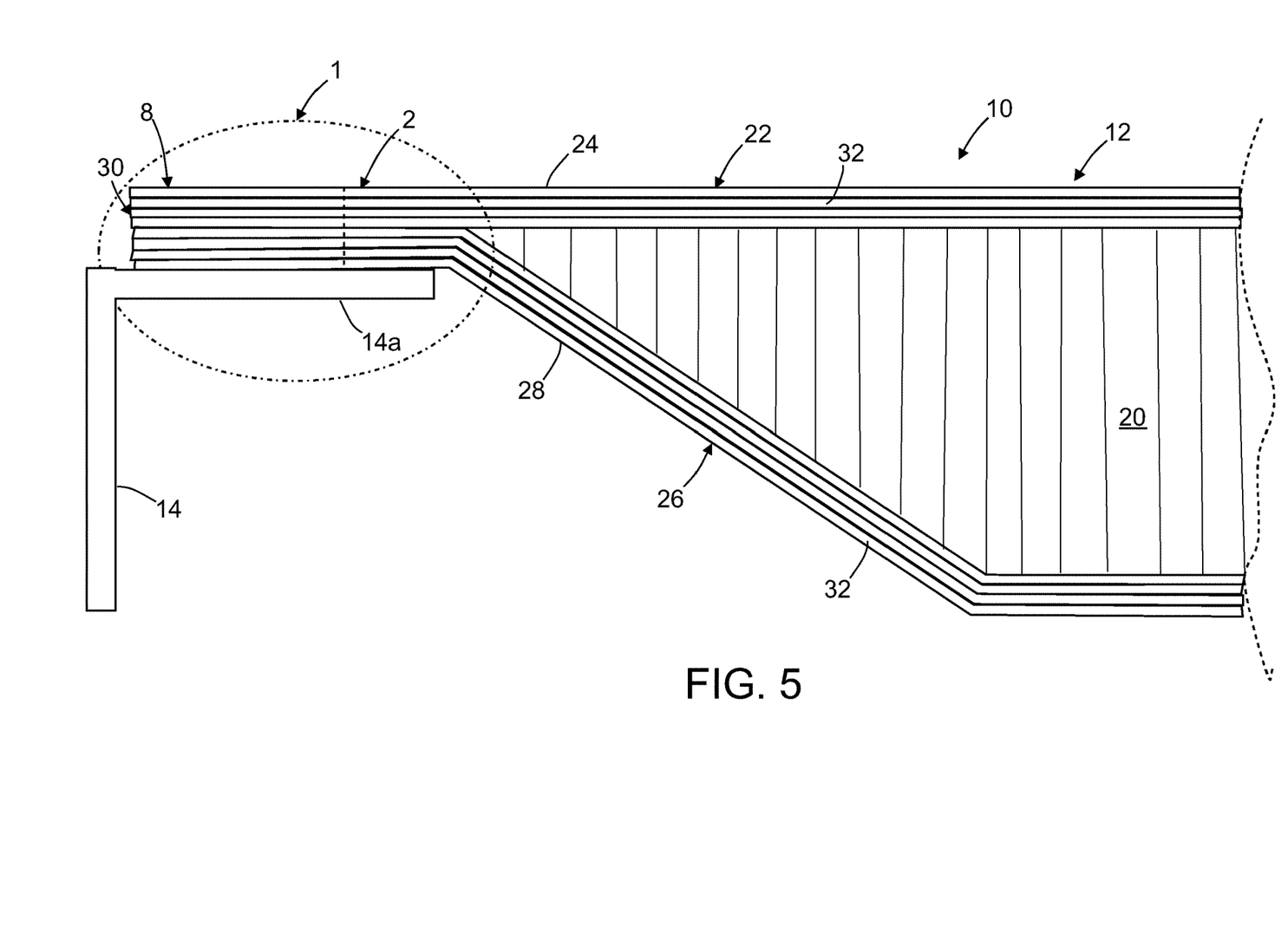
FIG. 5 is a diagram representing a sectional view of an assembly comprising a honeycomb panel having a damaged region in a composite laminate edge band.

The specific example embodiments described in some detail hereinafter are methods suitable for repairing any composite laminate having an OML and an IML. Although FIGS. 1 and 5 show the repair of a composite laminate that forms an edge band of a honeycomb panel comprising a low-density core sandwiched between two facesheets made of laminated composite material, it should be appreciated that the methods proposed herein are equally applicable to panels consisting of a stack of fiber-reinforced plies without a low-density core.

Figure 1:
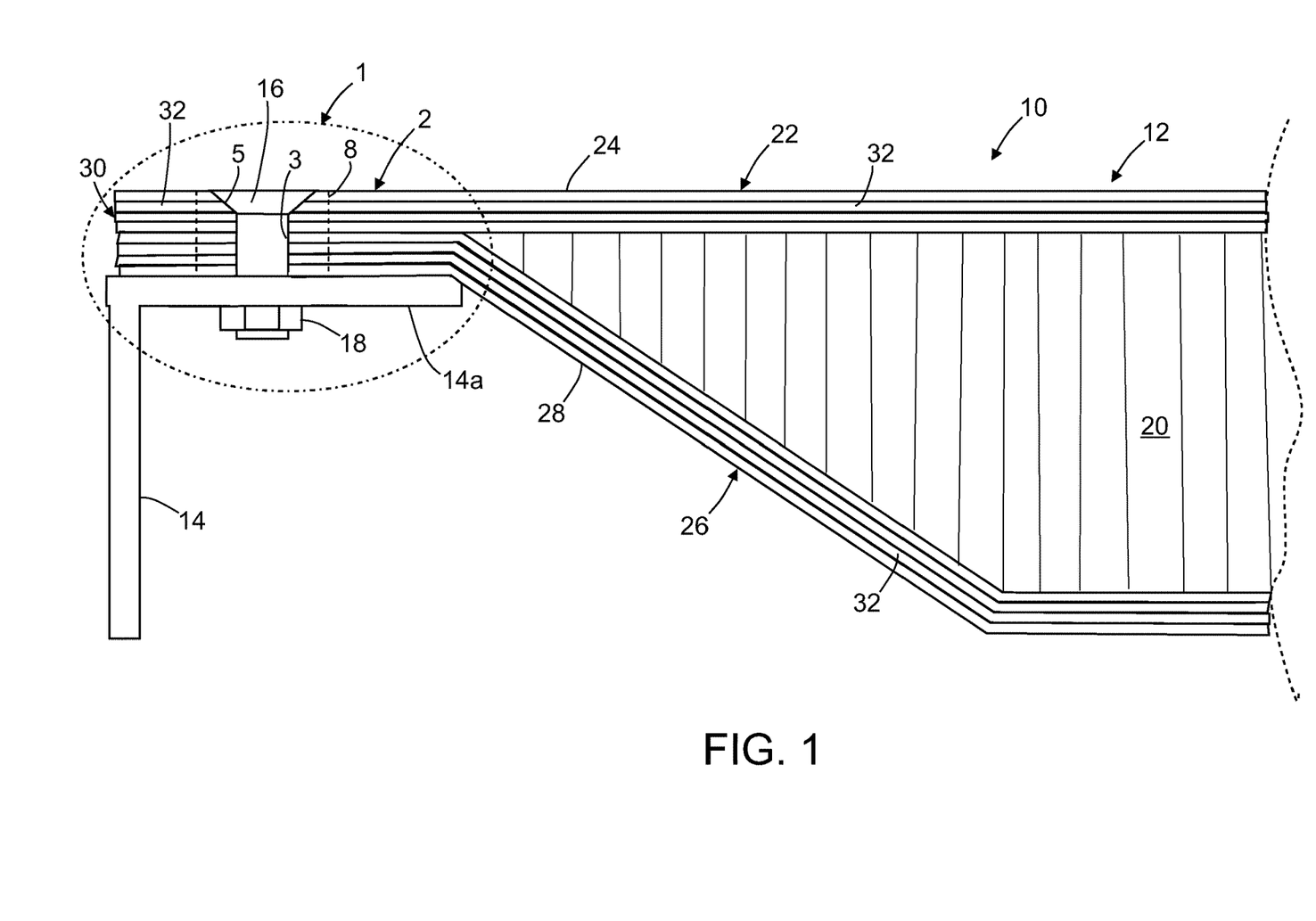
FIG. 1 is a diagram representing a sectional view of an assembly comprising a honeycomb panel having a composite laminate edge band fastened to a part, which edge band has damaged composite material in a volume surrounding the fastener.

FIG. 1 is a diagram representing a sectional view of an assembly 10 comprising a honeycomb panel 12 having an edge band 1 which is fastened to a part 14. The honeycomb panel 12 includes an upper facesheet 22, a lower facesheet 26, and a low-density core 20 which is sandwiched between upper facesheet 22 and lower facesheet 26 in a central region. The edge band 1 may surround the core 20 (not shown in FIG. 1). Each facesheet comprises a respective stack of fiber-reinforced plies 32, which stacks extend to and are joined together in the edge band 1 to form a composite laminate 2. The edge 30 of composite laminate 2 forms the outer boundary of edge band 1. The external surface of upper facesheet 22 forms the OML surface 24 of honeycomb panel 12; the external surface of lower facesheet 26 forms the IML surface 28 of honeycomb panel 12.

As seen in FIG. 1, the composite laminate 2 is fastened to a flange 14a of part 14 by means of a fastener assembly. In the example depicted in FIG. 1, the fastener assembly includes a bolt 16 and a nut 18 which is threadably coupled to a threaded shaft (threads not shown) of bolt 16. Other types of fasteners, such as rivets, screws, and pin/swaged collar assemblies may be used instead of a bolt/nut assembly.

In the example depicted in FIG. 1, the composite laminate 2 includes a damaged area 8 (indicated by a pair of vertical dashed lines in FIG. 1) which occupies a volume of space surrounding bolt 16. The bolt 16 is seated in a countersunk through hole 3 having a conical chamfer 5 for receiving a tapered head of bolt 16. In the alternative, a fastener through hole may be configured with a counterbore for receiving a socket head cap screw or may be a circular cylindrical bore in which the shaft of a rivet or bolt is seated.

To repair the damaged area 8, first the fasteners are unfastened and then the honeycomb panel 12 is removed from the aircraft and transported to a panel repair facility. The first step in the repair process is to remove any coating (e.g., paint) from the OML of the damaged area 8. Then the damaged portion of the composite material is removed by machining. In accordance with one embodiment of the repair method, a tapered router bit is used to form a conical cavity having a predefined shape and taper angle.

The next step is to create a conical plug having a size and shape which match the size and shape of the conical cavity using pre-cured shim stock made of similar material (e.g., FRP having fibers made of the same material as the fibers of the composite structure under repair). More specifically, the size of the conical plug is slightly smaller than the size of the conical cavity to enable the conical plug to fit in the conical cavity. The repair plug can be either machined down from stock conical repair material to the correct thickness and diametric profile or machined specifically for a particular cavity. After machining, the conical plug is bonded in the conical cavity using glue or adhesive (paste or film). If the original damaged area 8 included a fastener through hole, then a fastener through hole having the same configuration as the original fastener through hole is drilled in the conical plug after installation. Thereafter, a new coating is applied on the OML of the conical plug and surrounding OML surface of the honeycomb panel 12. The finished honeycomb panel 12 is then transported to the location of the aircraft and reinstalled on the aircraft using fasteners.

Optionally, after the conical plug has been bonded to the conical internal surface that bounds the conical cavity, a thin pre-cured repair patch (overlying and extending beyond the pre-cured plug) may be bonded to the pre-cured plug and to the surrounding portion of the OML surface of the original composite structure to provide additional retention force to the final installed repair. In this case, the new coating is applied on the OML of the pre-cured repair patch.

Figure 2:
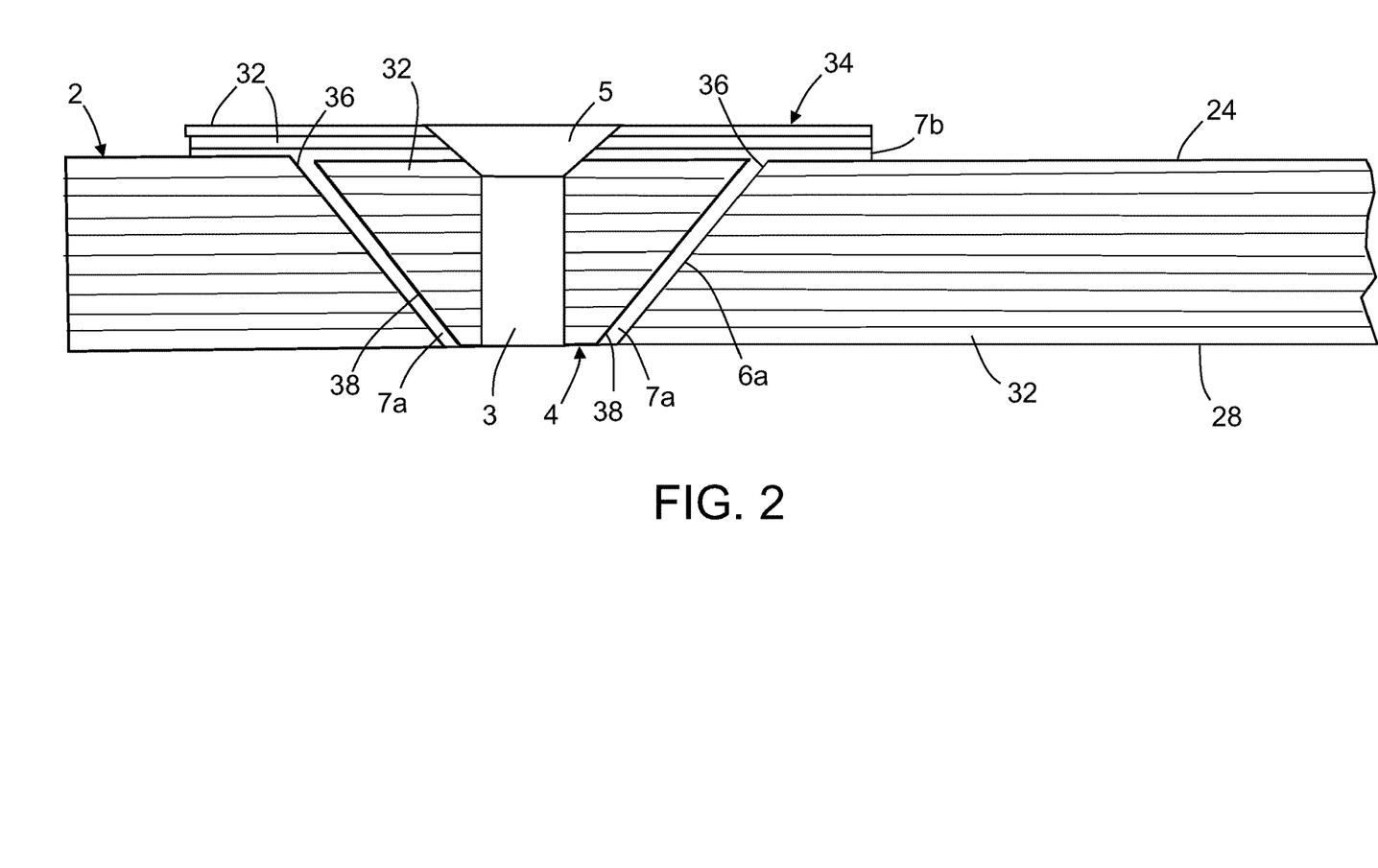
FIG. 2 is a diagram representing a sectional view of a conical pre-cured plug bonded in a conical cavity formed in a composite laminate, which conical plug has a fastener hole. In addition, a pre-cured patch is shown bonded to the plug and the OML of the composite laminate.

FIG. 2 is a diagram representing a sectional view of a completed single-sided pre-cured plug repair that entailed machining of a conical cavity 6a in a composite laminate 2 followed by installation of a conical pre-cured plug 4 (hereinafter "conical plug 4") in the conical cavity 6a. As used herein, the term "conical cavity" means a through hole or partial-depth recess having the shape of a truncated cone (e.g., a frustum). Similarly, the term "conical plug" means a plug having the shape of a truncated cone. In the example depicted in FIG. 2, the conical plug 4 has a countersunk through hole 3 with a chamfer 5 for receiving the tapered head of a fastener (not shown). The conical cavity 6a is bounded by a conical internal surface 36 that extends from a first opening at the OML surface 24 to a second opening at the IML surface 28 of the composite laminate 2.

The conical plug 4 is a composite laminate comprising a stack of fiber-reinforced plies 32 having different fiber orientations. More specifically, each fiber-reinforced ply 32 comprises a respective plurality of mutually parallel fibers embedded in an epoxy matrix. Preferably, the fibers of conical plug 4 are made of the same material (e.g., carbon or fiberglass) as the material of the fibers of the composite laminate 2. The OML and IML surfaces of conical plug 4 are respectively flush with the OML and IML surfaces 24 and 28 of the composite laminate 2. As seen in FIG. 2, the conical plug 4 has a conical surface 38 which opposes and is surrounded by the conical internal surface 36 of the composite laminate 2. The conical surface 38 of conical plug 4 is bonded to the conical internal surface 36 of the composite laminate 2 by adhesive 7a. In addition, a pre-cured patch 34 is shown bonded by adhesive 7b to the OML surface of conical plug 4 and to the OML surface 24 of composite laminate 2. The pre-cured patch 34 is optional.

Figure 3:
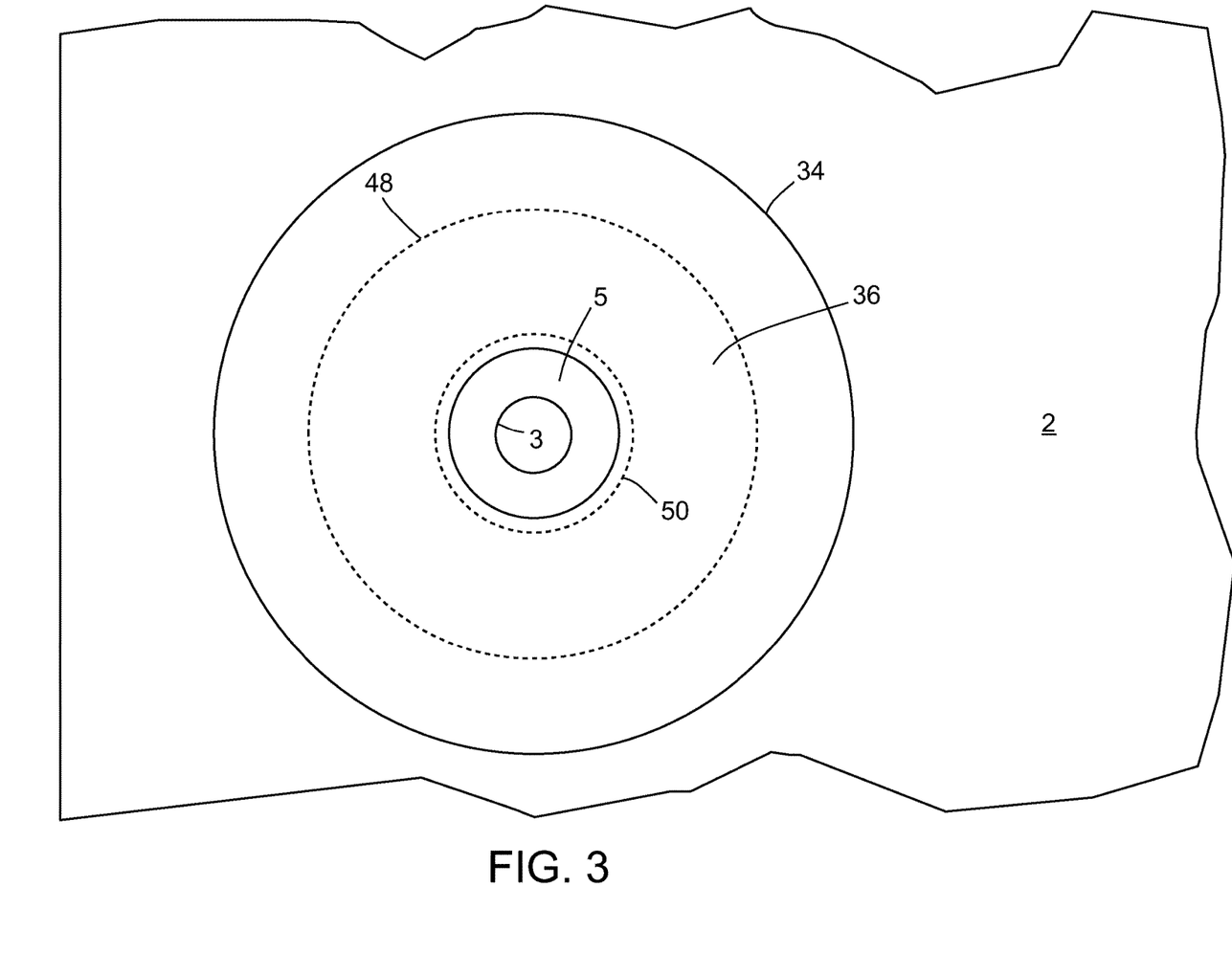
FIG. 3 is a diagram representing a top view of the assembly depicted in FIG. 2. The dashed circles indicate the openings of the conical cavity at the OML and IML respectively of the composite laminate, which openings are hidden in the top view.

FIG. 3 is a diagram representing a top view of the assembly depicted in FIG. 2. In the example depicted in FIGS. 2 and 3, the pre-cured patch 34 is circular. The conical internal surface 36, which bounds the conical cavity 6a, extends from a circular opening 48 (indicated by a dashed circle in FIG. 3) at the OML surface 24 of composite laminate 2 to a circular opening 50 (indicated by a dashed circle in FIG. 3) at the IML surface 28 of composite laminate 2. As seen in FIG. 3, the circular opening 50 at the IML surface 28 has a radius which is less than the radius of the circular opening 48 at the OML surface 24. In alternative embodiments, the conical cavity may be a conical recess that does not extend through the entire depth of the composite laminate 2, in which case the height of the conical plug may be reduced.

In accordance with another embodiment, the damaged area 8 is removed from the edge band 1 of composite laminate 2 by machining a double-conical cavity instead of a simple conical cavity. This process involves machining one side of the composite laminate 2 using a tapered router bit and then machining the other side of the composite laminate 2 using the same tapered router bit. As used herein, the term "double-conical cavity" means a cavity having the shape of two truncated cones (e.g., two frustums) sharing a common plane of truncation.

Figure 4:
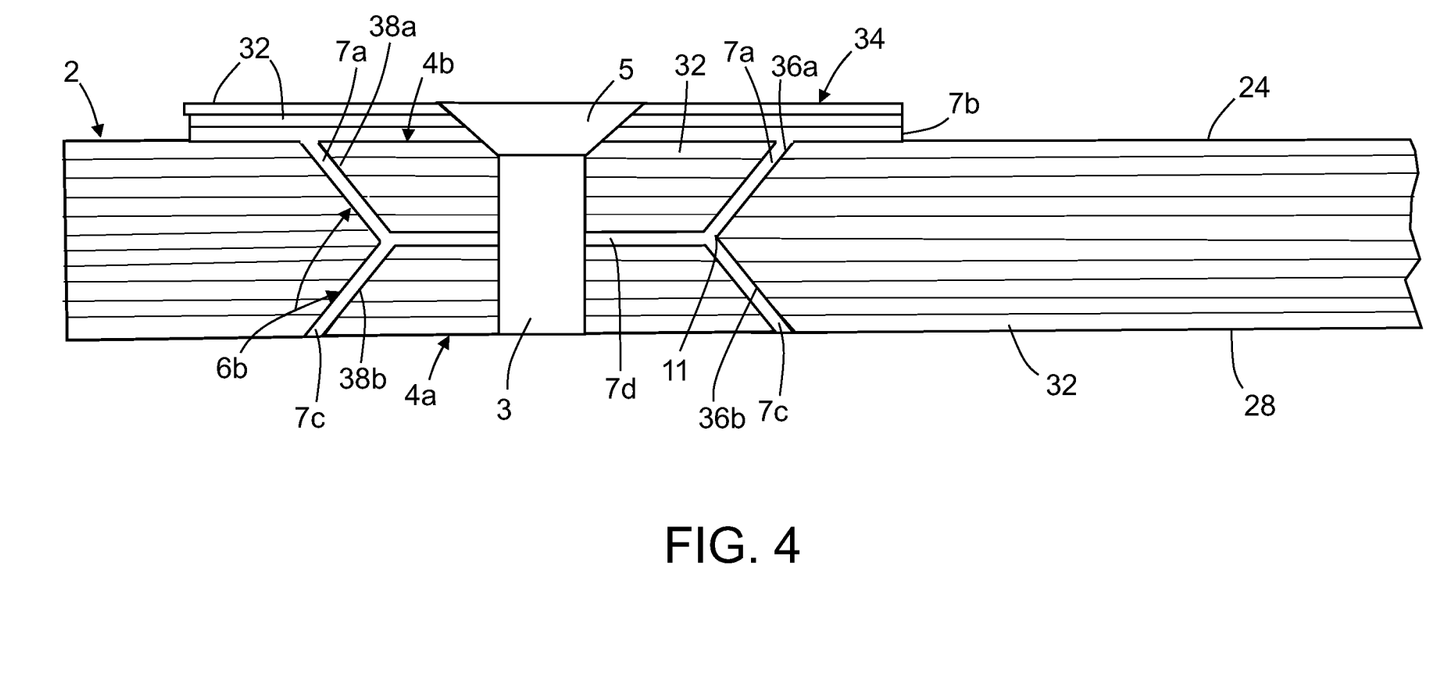
FIG. 4 is a diagram representing a sectional view of two conical pre-cured plugs bonded in a double-conical cavity formed in a composite laminate, which conical plugs have a fastener hole. In addition, a pre-cured patch is shown bonded to the upper plug and the OML of the composite laminate.

FIG. 4 is a diagram representing a sectional view of a completed double-sided pre-cured plug repair which entailed machining a double-conical cavity 6b in a composite laminate 2 followed by installation of a pair of conical pre-cured plugs 4a and 4b (hereinafter "conical plugs 4a and 4b") in respective spaces of the double-conical cavity 6b. The upper space of the double-conical cavity 6b is bounded by a first conical internal surface 36a that extends from an opening at the OML surface 24 of composite laminate 2; the lower space of the double-conical cavity 6b is bounded by a second conical internal surface 36b that extends from an opening at the IML surface 28 of composite laminate 2. The first and second conical internal surfaces 36a and 36b, which bound the double-conical cavity 6b, intersect at a circular intersection 11.

The conical plugs 4a and 4b are respective composite laminates, each composite laminate comprising a stack of fiber-reinforced plies 32 as previously described. In the example depicted in FIG. 4, the conical plugs 4a and 4b have respective portions of a countersunk through hole 3 with a chamfer 5 for receiving the tapered head of a fastener (not shown). The OML surface of conical plug 4a is flush with the OML surface 24 of composite laminate 2; the IML surface of conical plug 4b is flush with the IML surface 28 of composite laminate 2. As seen in FIG. 4, the conical plug 4a has a conical surface 38a which opposes and is surrounded by the conical internal surface 36a of composite laminate 2; the conical plug 4b has a conical surface 38b which opposes and is surrounded by the conical internal surface 36b of composite laminate 2.

As seen in FIG. 4, the conical surface 38a of conical plug 4a is bonded to the conical internal surface 36a of composite laminate 2 by adhesive 7a, while the conical surface 38b of conical plug 4b is bonded to the conical internal surface 36b of composite laminate 2 by adhesive 7c. At the same time, the opposing surfaces of conical plugs 4a and 4b are bonded to each other by adhesive 7d. All of the adhesive 7a, 7c, and 7d is cured at the same time. At a subsequent time, the pre-cured patch 34 is bonded by adhesive 7b to the OML surface of conical plug 4a and to the OML surface 24 of composite laminate 2.

In accordance with a further embodiment, the damaged area 8 is removed from the edge band 1 of composite laminate 2 by machining a tapered slot which extends all the way to the edge 30. This process involves machining one side of the composite laminate 2 using a tapered router bit.

FIG. 5 is a diagram representing a sectional view of an assembly 10 comprising a honeycomb panel 12 having an edge band 1 which is fastened to a part 14 by fasteners not shown. Whereas the assembly 10 depicted in FIG. 1 was sectioned in a plane that intersected a fastener, FIG. 5 shows an assembly which has been sectioned in an edge band area disposed between two adjacent fasteners. As previously described, the honeycomb panel 12 includes an upper facesheet 22, a lower facesheet 26, and a low-density core 20. In the edge band 1, the plies 32 of upper facesheet 22 and lower facesheet 26 form the composite laminate 2. The edge 30 of composite laminate 2 forms the outer boundary of edge band 1. The external surface of upper facesheet 22 forms the OML surface 24 of honeycomb panel 12; the external surface of lower facesheet 26 forms the IML surface 28 of honeycomb panel 12.

In the example depicted in FIG. 5, the composite laminate 2 includes a damaged area 8 which extends from the vertical dashed line to the edge 30 of composite laminate 2. To repair the damaged area 8, any coating (e.g., paint) is removed from the OML of the damaged area 8. Then the damaged portion of the composite material is removed by machining. In accordance with one embodiment of the repair method, a tapered router bit is used to form a tapered slot having a predefined shape and taper angle, which tapered slot extends all the way to the edge 30 and through the entire depth of the composite laminate. In accordance with alternative embodiments, a tapered slot that does not extend to the edge 30 may be used in place of a conical cavity. Instead of a full-depth tapered slot, the damaged material may be removed by machining a partial-depth tapered recess.

The next step is to create a tapered plug having a size and shape which match the size and shape of the tapered slot using pre-cured shim stock made of similar material. More specifically, the size of the tapered plug is slightly smaller than the size of the tapered slot to enable the tapered plug to fit in the tapered slot. The tapered plug can be either machined down from stock repair material to the correct thickness and profile or machined specifically for a particular slot. After machining, the tapered plug is bonded in the tapered slot using glue or adhesive (paste or film). If the original damaged area 8 included a fastener through hole, then a fastener through hole having the same configuration as the original fastener through hole is drilled in the tapered plug after installation. Thereafter, a new coating is applied on the OML of the tapered plug and surrounding OML surface of the honeycomb panel 12. The finished honeycomb panel 12 is then transported to the location of the aircraft and reinstalled on the aircraft using fasteners.

Optionally, after the tapered plug has been bonded to the tapered internal surface that bounds the tapered slot, a thin pre-cured repair patch (overlying and extending beyond the pre-cured plug) may be bonded to the pre-cured plug and to the surrounding portion of the OML surface of composite laminate 2 to provide additional retention force to the final installed repair. In this case, the new coating is applied on the OML of the pre-cured repair patch.

Figure 6:
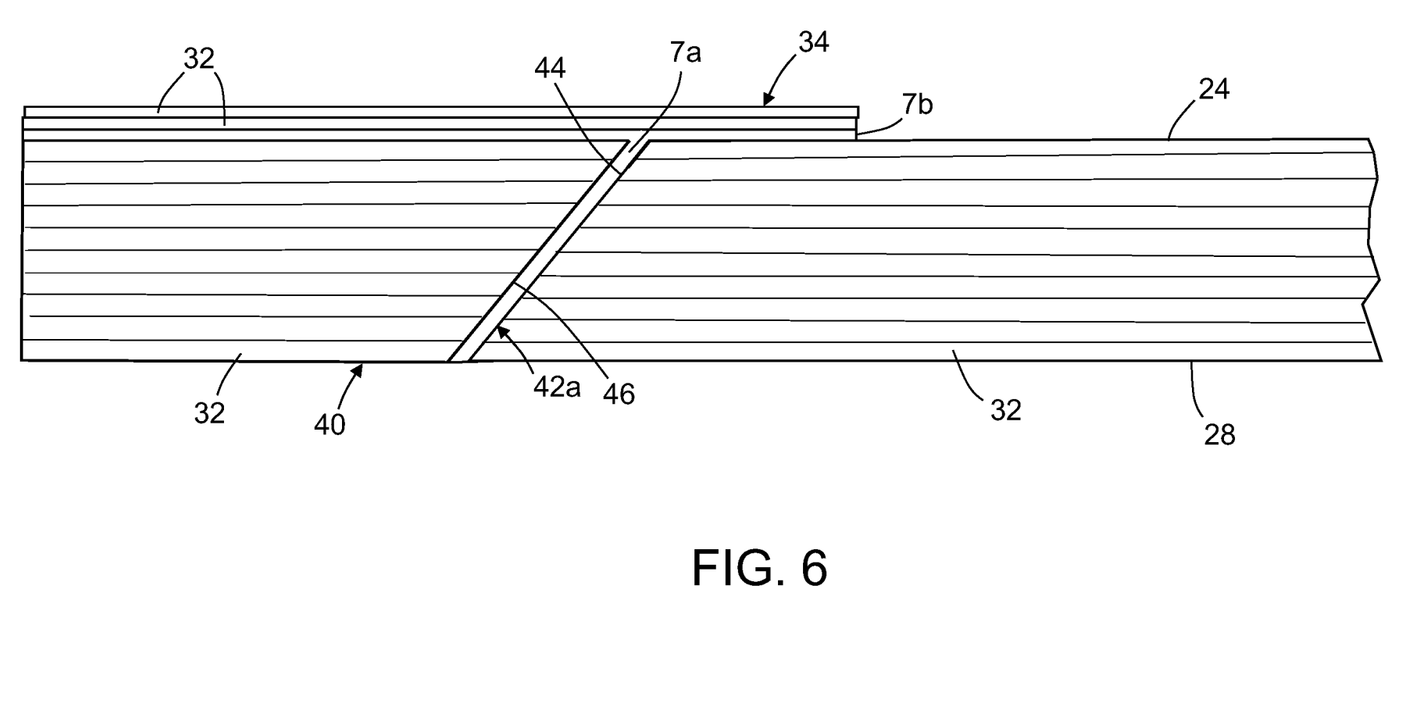
FIG. 6 is a diagram representing a sectional view of a tapered pre-cured plug bonded in a tapered slot formed in a composite laminate. In addition, a pre-cured patch is shown bonded to the plug and the OML of the composite laminate.

FIG. 6 is a diagram representing a sectional view of a completed single-sided pre-cured plug repair that entailed machining of a tapered slot 42a in a composite laminate 2 followed by installation of a pre-cured tapered plug 40 (hereinafter "tapered plug 40") in the tapered slot 42a. The tapered slot 42a is bounded by a tapered internal surface 44 that extends to the edge 30. The tapered slot 42a is a composite laminate comprising a stack of fiber-reinforced plies 32 having different fiber orientations, as previously described. As seen in FIG. 6, the tapered plug 40 has a tapered surface 46 which opposes the tapered internal surface 44 of the composite laminate 2. The tapered surface 46 of tapered plug 40 is bonded to the tapered internal surface 44 of composite laminate 2 by adhesive 7a. In addition, a pre-cured patch 34 is shown bonded by adhesive 7b to the OML surface of tapered plug 40 and to the OML surface 24 of composite laminate 2.

Figure 7:
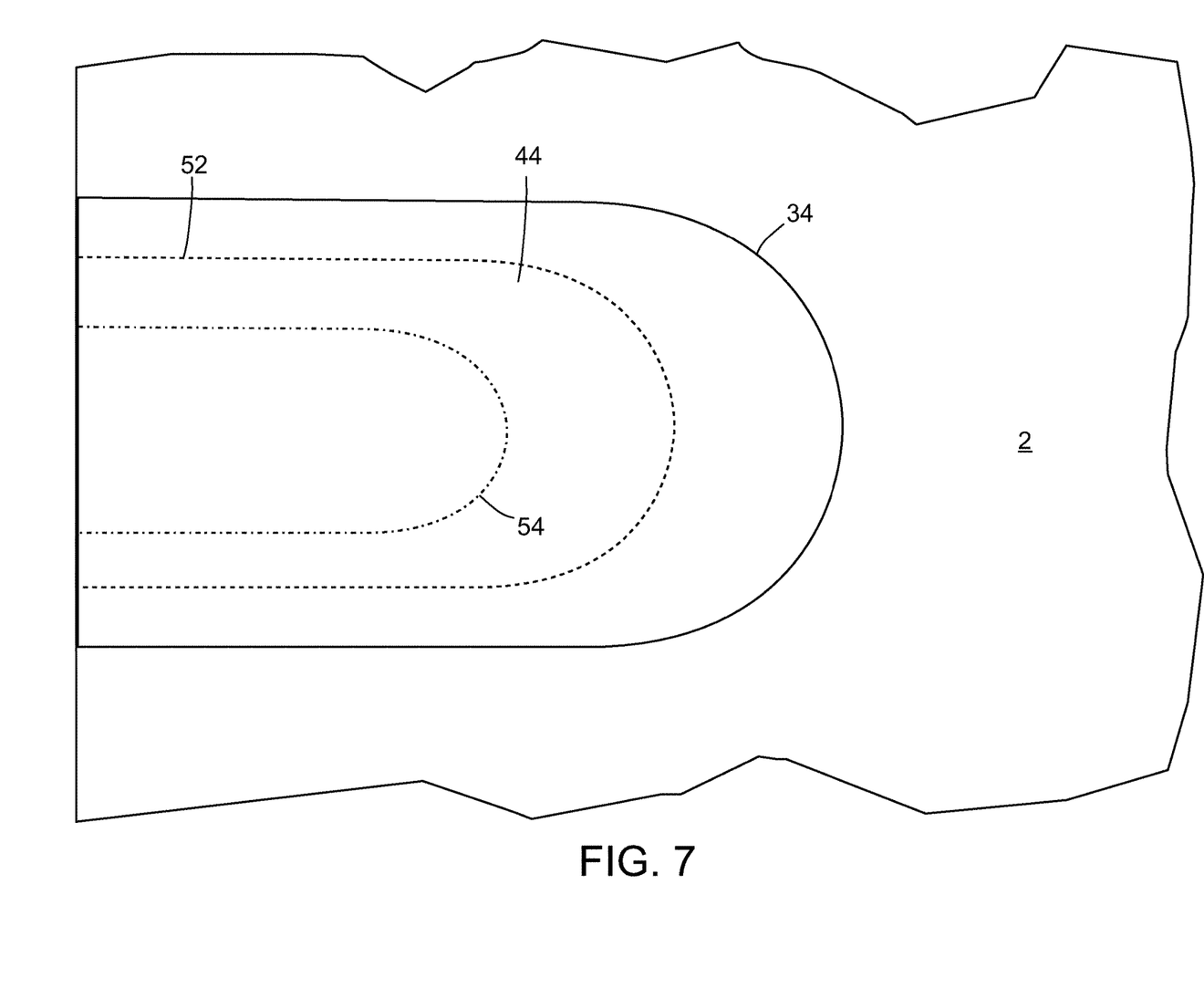
FIG. 7 is a diagram representing a top view of the assembly depicted in FIG. 6. The dashed circles indicate the openings of the tapered slot at the OML and IML respectively of the composite laminate, which openings are hidden in the top view.

FIG. 7 is a diagram representing a top view of the assembly depicted in FIG. 6. In the example depicted in FIGS. 6 and 7, tapered internal surface 44, which bounds the tapered slot 42a, extends from an opening 52 (indicated by a dashed line in FIG. 7) at the OML surface 24 of composite laminate 2 to an opening 54 (indicated by a dash-dot line in FIG. 7) at the IML surface 28 of composite laminate 2. As seen in FIG. 7, the opening 54 at the IML surface 28 has a width and a radius which are respectively less than the width and radius of the opening 52 at the OML surface 24.

In accordance with another embodiment, the damaged area 8 depicted in FIG. 5 is removed from the edge band 1 of composite laminate 2 by machining a double-tapered slot instead of a simple tapered slot. This process involves machining one side of the composite laminate 2 using a tapered router bit and then machining the other side of the composite laminate 2 using the same tapered router bit.

Figure 8:
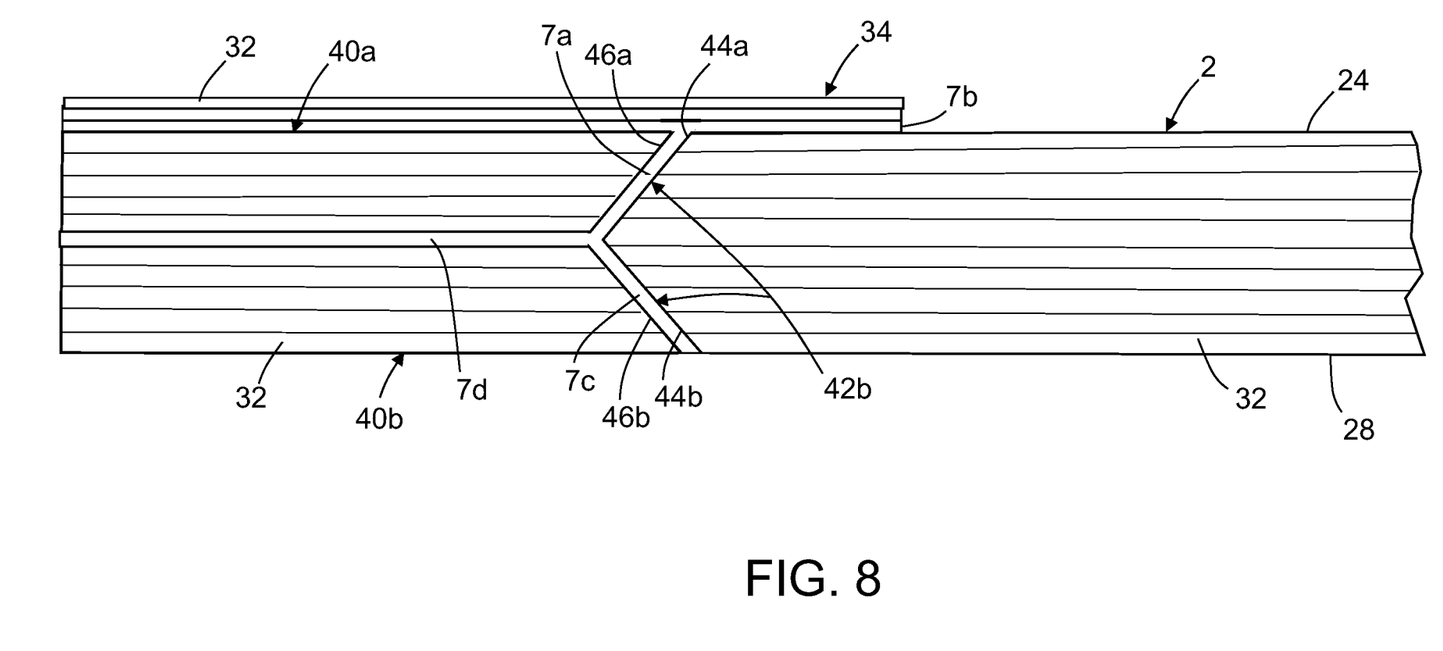
FIG. 8 is a diagram representing a sectional view of two tapered pre-cured plugs bonded in a double-tapered slot formed in a composite laminate. In addition, a pre-cured patch is shown bonded to the upper plug and the OML of the composite laminate.

FIG. 8 is a diagram representing a sectional view of a completed double-sided pre-cured plug repair achieved by first machining a double-tapered slot 42b in composite laminate 2 and then installing a pair of tapered pre-cured plugs 40a and 40b (hereinafter "tapered plugs 40a and 40b") in respective spaces of the double-tapered slot 42b. The upper space of the double-tapered slot 42b is bounded by a first tapered internal surface 44a that extends from an opening at the OML surface 24 of composite laminate 2; the lower space of the double-tapered slot 42b is bounded by a second tapered internal surface 44b that extends from an opening at the IML surface 28 of composite laminate 2. The first and second tapered internal surfaces 44a and 44b, which bound the double-tapered slot 42b, intersect at an intersection. The tapered plugs 40*a* and 40*b* are respective composite laminates, each composite laminate comprising a stack of fiber-reinforced plies 32 as previously described.

As seen in FIG. 8, the tapered plug 40*a* has a tapered surface 46*a* which opposes and is bonded to the tapered internal surface 44*a* of composite laminate 2; the tapered plug 40*b* has a tapered surface 46*b* which opposes and is bonded to the tapered internal surface 44*b* of composite laminate 2 The tapered surface 46*a* of tapered plug 40*a* is bonded to the tapered internal surface 44*a* of composite laminate 2 by adhesive 7*a*, while the tapered surface 46*b* of tapered plug 40*b* is bonded to the tapered internal surface 44*b* of composite laminate 2 by adhesive 7*c*. At the same time, the opposing surfaces of tapered plugs 40*a* and 40*b* are bonded to each other by adhesive 7*d*. All of the adhesive 7*a*, 7*c*, and 7*d* is cured at the same time. At a subsequent time, the pre-cured patch 34 is bonded by adhesive 7*b* to the OML surface of tapered plug 40*a* and to the OML surface 24 of composite laminate 2.

Figure 9:
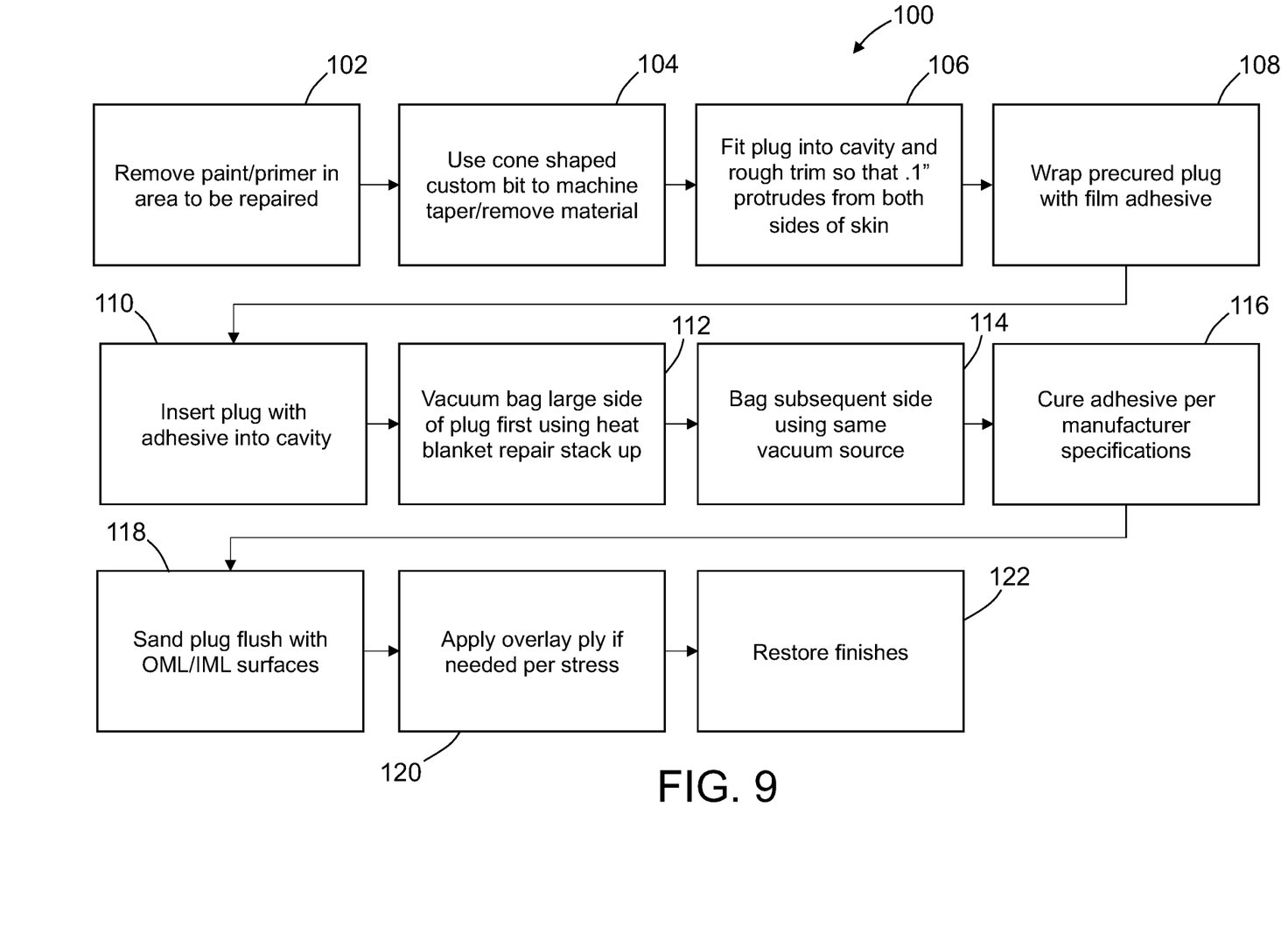
FIG. 9 is a diagram identifying steps of a method for repairing a composite structure using a pre-cured conical plug of the type depicted in FIG. 2.

FIG. 9 is a diagram identifying steps of a method 100 for repairing a composite structure using a pre-cured conical plug of the type depicted in FIG. 2. Method 100 begins by removing paint and primer from above the area of the composite structure to be repaired (step 102). Then a cone-shaped custom router bit is used to remove material from the area to be repaired and machine a tapered internal surface (step 104). In the embodiment depicted in FIG. 2, composite material is removed from the composite laminate to form a conical cavity bounded by a conical internal surface that extends from one opening at the OML surface to the other opening at the IML surface of the composite laminate. A conical plug is fitted into the conical cavity such that a conical surface of the plug opposes the conical internal surface of the machined composite laminate and then the projecting portions of the plug are machined to reduce the respective distances by which the plug projects beyond the OML and IML surfaces of the composite laminate skin (step 106). For example, the conical plug may be rough trimmed so that a 0.1-inch thickness of plug material protrudes from both sides (OML and IML) of the composite laminate skin. The conical plug is then removed from conical cavity and wrapped with film adhesive (step 108). Thereafter, the plug with adhesive is inserted back into the cavity (step 110).

The conical surface of the plug is then bonded to the conical internal surface of the composite laminate. First, a heat blanket repair stack is placed over the large side (OML) of the conical plug (including a layer of bleeder material between the heat blanket and the plug) and then covered with a vacuum bag (step 112). In addition, the other side (IML) of the plug is bagged using the same vacuum source (step 114). Thereafter, vacuum pressure and heat are applied to cure the adhesive in accordance with adhesive manufacturer specifications (step 116).

After the adhesive at the interface of the conical surface of the plug and the conical internal surface of the composite laminate has been cured, the plug is sanded flush with the OML and IML surfaces of the composite laminate (step 118). Then a pre-cured overlay ply or patch is applied to the OML of the plug and surrounding portion of the composite laminate (step 120). An overlay patch may be applied by placing adhesive between the patch and plug and then curing the adhesive. The finishes are then restored (step 122). Optionally, if the material removed in step 104 included a through hole for a fastener, a new through hole may be drilled in the plug after sanding and before the finishes are restored.

The plug may be made of the same composite material that is being repaired (i.e., the same fibers, same epoxy resin, and same distribution of fibers in the epoxy matrix). More specifically, the thicknesses and fiber orientations of the plies of the patch may match the thicknesses and fiber orientations of the plies of the composite material. The fiber orientations in the portions of the plies removed may have different orientations. Each ply may have an orientation that is selected to achieve a particular property or properties. For example, the orientations may be selected to provide properties such as a desired strength, durability, and other suitable features. Preferably, the plies installed have the same orientation, thickness, and materials as the plies removed.

While methods for repairing composite structures using pre-cured plugs have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

As used in the claims, the term "composite laminate" refers to a composite laminate that has been cured or pre-cured, while the term "tapered" excludes stepped.

The invention claimed is:

1. A method for repairing a honeycomb panel comprising a low-density core sandwiched between two facesheets made of laminated plies of composite material, wherein portions of the two facesheets form an edge band comprising a first composite laminate having an outer boundary formed by edges of the laminated plies of the two facesheets, which outer boundary extends from the outer mold line surface to the inner mold line surface of the first composite laminate, the method comprising:

(a) removing composite material from the first composite laminate, including a portion of the outer boundary, to form a tapered slot bounded by a tapered internal surface that extends from a first opening at an outer mold line surface of the first composite laminate to a second opening at an inner mold line surface of the first composite laminate;

(b) machining a second composite laminate to form a plug having a tapered surface designed to oppose the tapered internal surface of the first composite laminate when the plug is placed in the tapered slot;

(c) placing the plug in the tapered slot so that the tapered surface of the plug opposes the tapered internal surface of the first composite laminate; and (d) bonding the tapered surface of the plug to the tapered internal surface of the first composite laminate, wherein subsequent to removing composite material and prior to placing the plug in the tapered slot, the tapered slot extends to the outer boundary of the first composite laminate to form a gap in the outer boundary where portions of the edges of the laminated plies in the edge band were removed.

2. The method as recited in claim 1, further comprising placing adhesive between the plug and the first composite laminate, wherein step (d) comprises curing the adhesive.

3. The method as recited in claim 1, further comprising:
(e) trimming the plug to form a first surface that intersects the tapered surface of the plug subsequent to step (c) and prior to step (d); and
(f) sanding the first surface of the plug to form a second surface which is flush with the outer mold line surface of the first composite laminate subsequent to step (d).

4. The method as recited in claim 3, further comprising:
(g) placing a patch so that the patch overlies the second surface of the plug and a portion of the outer mold line surface of the first composite laminate that surrounds a perimeter of the second surface of the plug subsequent to step (f); and
(h) bonding the patch to the plug and to the first composite laminate.

5. The method as recited in claim 4, further comprising restoring a finish after bonding the patch to the plug.

6. The method as recited in claim 4, further comprising drilling a hole in the plug after sanding.

7. The method as recited in claim 1, further comprising placing glue between the plug and the first composite laminate, wherein step (d) comprises curing the glue.

8. A method for repairing a honeycomb panel comprising a low-density core sandwiched between two facesheets made of laminated plies of composite material, wherein portions of the two facesheets form an edge band comprising a first composite laminate having an outer boundary formed by edges of the laminated plies of the two facesheets, which outer boundary extends from the outer mold line surface to the inner mold line surface of the first composite laminate, the method comprising:
(a) removing composite material from the first composite laminate, including a portion of the outer boundary, to form a double-tapered slot bounded by a first tapered internal surface that extends from an opening at an outer mold line surface of the first composite laminate and a second tapered internal surface that extends from an opening at an inner mold line surface of the first composite laminate to an intersection with the first tapered internal surface;
(b) machining a second composite laminate to form a first plug having a tapered surface;
(c) placing the first plug in the double-tapered slot so that the tapered surface of the first plug opposes the first tapered internal surface of the first composite laminate; and
(d) machining a third composite laminate to form a second plug having a tapered surface;
(e) placing the second plug in the double-tapered slot so that the tapered surface of the second plug opposes the second tapered internal surface of the first composite laminate; and
(f) bonding the tapered surface of the first plug to the first tapered internal surface of the first composite laminate and bonding the tapered surface of the second plug to the second tapered internal surface of the first composite laminate,
wherein subsequent to removing composite material and prior to placing the first and second plugs in the double-tapered slot, the double-tapered slot extends to the outer boundary of the first composite laminate to form a gap in the outer boundary where portions of the edges of the laminated plies in the edge band were removed.

9. The method as recited in claim 8, wherein the second plug is bonded to the first plug during step (d).

10. The method as recited in claim 9, further comprising placing adhesive between the first plug and the second plug, between the first plug and the first composite laminate, and between the second plug and the first composite laminate, wherein step (d) comprises curing the adhesive.

11. The method as recited in claim 9, further comprising placing glue between the first plug and the second plug, between the first plug and the first composite laminate, and between the second plug and the first composite laminate, wherein step (d) comprises curing the glue.

12. The method as recited in claim 9, further comprising wrapping the first and second plugs with film adhesive prior to placing the first and second plugs, wherein step (d) comprises curing the film adhesive.

13. The method as recited in claim 8, wherein the double-tapered slot extends to the outer boundary of and through an entire depth of the first composite laminate.

14. A method for repairing a honeycomb panel comprising a low-density core sandwiched between two facesheets made of laminated plies of composite material, wherein portions of the two facesheets form an edge band comprising a first composite laminate having an outer boundary formed by edges of the laminated plies of the two facesheets, which outer boundary extends from an outer mold line surface to an inner mold line surface of the first composite laminate, the method comprising:
(a) removing composite material from the first composite laminate, including a portion of the outer boundary, to form a tapered slot bounded by a tapered internal surface that extends from a first opening at the outer mold line surface of the first composite laminate to a second opening at the inner mold line surface of the first composite laminate;
(b) machining a second composite laminate to form a plug having a tapered surface designed to oppose the tapered internal surface of the first composite laminate when the plug is placed in the tapered slot;
(c) placing the plug in the tapered slot so that the tapered surface of the plug opposes the first tapered internal surface of the first composite laminate; and
(d) bonding the tapered surface of the plug to the tapered internal surface of the first composite laminate,
wherein subsequent to removing composite material and prior to placing the plug in the tapered slot, the tapered slot extends to the outer boundary of the first composite laminate to form a gap in the outer boundary where portions of the edges of the laminated plies in the edge band were removed.

15. The method as recited in claim 14, further comprising placing adhesive between the plug and the first composite laminate, wherein step (d) comprises curing the adhesive.

16. The method as recited in claim 14, further comprising placing glue between the plug and the first composite laminate, wherein step (d) comprises curing the glue.

17. The method as recited in claim 14, further comprising:
(e) trimming the plug to form a first surface that intersects the tapered surface of the plug subsequent to step (c) and prior to step (d); and
(f) sanding the first surface of the plug to form a second surface which is flush with the outer mold line surface of the first composite laminate subsequent to step (d).

18. The method as recited in claim 17, further comprising:
(g) placing a patch so that the patch overlies the second surface of the plug and a portion of the outer mold line surface of the first composite laminate that surrounds a perimeter of the second surface of the plug subsequent to step (f); and (h) bonding the patch to the plug and to the first composite laminate.

19. The method as recited in claim 17, further comprising drilling a hole in the plug after sanding.

20. The method as recited in claim 17, further comprising restoring a finish after bonding the patch to the plug.

* * * * *